United States Patent
Prins

(10) Patent No.: US 9,003,264 B1
(45) Date of Patent: Apr. 7, 2015

(54) SYSTEMS, METHODS, AND DEVICES FOR MULTI-DIMENSIONAL FLASH RAID DATA PROTECTION

(71) Applicant: SanDisk Enterprise IP LLC, Mipitas, CA (US)

(72) Inventor: Douglas A. Prins, Laguna Hills, CA (US)

(73) Assignee: SanDisk Enterprise IP LLC, Milpitas, CA (US)

( * ) Notice: Subject to any disclaimer, the term of this patent is extended or adjusted under 35 U.S.C. 154(b) by 222 days.

(21) Appl. No.: 13/831,707

(22) Filed: Mar. 15, 2013

Related U.S. Application Data

(60) Provisional application No. 61/747,779, filed on Dec. 31, 2012.

(51) Int. Cl.
*G11C 29/00* (2006.01)
*G06F 11/10* (2006.01)

(52) U.S. Cl.
CPC ...................................... *G06F 11/10* (2013.01)

(58) Field of Classification Search
CPC .............. G06F 11/1068; G06F 11/072; G06F 11/1008; G06F 11/1076; G11C 29/00
USPC ......................................................... 714/773
See application file for complete search history.

(56) References Cited

U.S. PATENT DOCUMENTS

| | | | |
|---|---|---|---|
| 4,916,652 A | 4/1990 | Schwarz et al. | |
| 5,270,979 A | 12/1993 | Harari et al. | |
| 5,519,847 A | 5/1996 | Fandrich et al. | |
| 5,530,705 A | 6/1996 | Malone, Sr. | |
| 5,537,555 A | 7/1996 | Landry et al. | |
| 5,551,003 A | 8/1996 | Mattson et al. | |
| 5,657,332 A | 8/1997 | Auclair et al. | |
| 5,666,114 A | 9/1997 | Brodie et al. | |

(Continued)

FOREIGN PATENT DOCUMENTS

| EP | 1465203 A1 | 10/2004 |
|---|---|---|
| JP | 2002-532806 S | 10/2002 |

(Continued)

OTHER PUBLICATIONS

Barr, Introduction to Watchdog Timers, Oct. 2001, 3 pgs.

(Continued)

*Primary Examiner* — Albert DeCady
*Assistant Examiner* — Enam Ahmed
(74) *Attorney, Agent, or Firm* — Morgan, Lewis & Bockius LLP

(57) ABSTRACT

A method for recovering corrupted data stored in persistent memory provides protection against, at least, loss of a single block, loss of a single page, as well as a high number of random retention errors. In some implementations, each data element in a quadrant of the persistent memory is protected by a row check word and a diagonal check word. Each row check word includes a value resulting from a mathematical operation performed on a respective row set comprising a set of data elements and each diagonal check word in the quadrant includes a value resulting from a mathematical operation performed on a respective diagonal set comprising a set of data elements distributed over the banks, blocks and pages in the quadrant so that failure of any one page, block or die in the quadrant does not result in the loss of any data in the quadrant.

24 Claims, 12 Drawing Sheets

(56) References Cited

U.S. PATENT DOCUMENTS

| | | |
|---|---|---|
| 5,708,849 A | 1/1998 | Coke et al. |
| 5,765,185 A | 6/1998 | Lambrache et al. |
| 5,943,692 A | 8/1999 | Marberg et al. |
| 5,982,664 A | 11/1999 | Watanabe |
| 6,000,006 A | 12/1999 | Bruce et al. |
| 6,016,560 A | 1/2000 | Wada et al. |
| 6,018,304 A | 1/2000 | Bessios |
| 6,070,074 A | 5/2000 | Perahia et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,295,592 B1 | 9/2001 | Jeddeloh |
| 6,311,263 B1 | 10/2001 | Barlow et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,678,788 B1 | 1/2004 | O'Connell |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,871,257 B2 | 3/2005 | Conley et al. |
| 6,895,464 B2 | 5/2005 | Chow et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,100,002 B2 | 8/2006 | Shrader |
| 7,111,293 B1 | 9/2006 | Hersh et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,328,377 B1 | 2/2008 | Lewis et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,042,011 B2 | 10/2011 | Nicolaidis et al. |
| 8,069,390 B2 | 11/2011 | Lin |
| 8,190,967 B2 | 5/2012 | Hong et al. |
| 8,254,181 B2 | 8/2012 | Hwang et al. |
| 8,259,506 B1 | 9/2012 | Sommer et al. |
| 8,312,349 B2 | 11/2012 | Reche et al. |
| 8,412,985 B1 | 4/2013 | Bowers et al. |
| 2002/0024846 A1 | 2/2002 | Kawahara et al. |
| 2002/0083299 A1 | 6/2002 | Van Huben et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0088805 A1 | 5/2003 | Majni et al. |
| 2003/0093628 A1 | 5/2003 | Matter et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0073829 A1 | 4/2004 | Olarig |
| 2004/0153902 A1 | 8/2004 | Machado et al. |
| 2004/0181734 A1 | 9/2004 | Saliba |
| 2004/0199714 A1 | 10/2004 | Estakhri et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0114587 A1 | 5/2005 | Chou et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0085671 A1 | 4/2006 | Majni et al. |
| 2006/0087893 A1 | 4/2006 | Nishihara et al. |
| 2006/0136570 A1 | 6/2006 | Pandya |
| 2006/0156177 A1 | 7/2006 | Kottapalli et al. |
| 2006/0195650 A1 | 8/2006 | Su et al. |
| 2006/0259528 A1 | 11/2006 | Dussud et al. |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0091677 A1 | 4/2007 | Lasser et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0201274 A1 | 8/2007 | Yu et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0052446 A1 | 2/2008 | Lasser et al. |
| 2008/0056005 A1 | 3/2008 | Aritome |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0144371 A1 | 6/2008 | Yeh et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |

(56) References Cited

U.S. PATENT DOCUMENTS

| | | |
|---|---|---|
| 2008/0270680 A1 | 10/2008 | Chang |
| 2008/0282128 A1 | 11/2008 | Lee et al. |
| 2008/0285351 A1 | 11/2008 | Shlick et al. |
| 2009/0003058 A1 | 1/2009 | Kang |
| 2009/0037652 A1 | 2/2009 | Yu et al. |
| 2009/0125671 A1 | 5/2009 | Flynn et al. |
| 2009/0144598 A1 | 6/2009 | Yoon et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0207660 A1 | 8/2009 | Hwang et al. |
| 2009/0222708 A1 | 9/2009 | Yamaga |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0319864 A1 | 12/2009 | Shrader |
| 2010/0002506 A1 | 1/2010 | Cho et al. |
| 2010/0037012 A1 | 2/2010 | Yano et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0161936 A1 | 6/2010 | Royer et al. |
| 2010/0199125 A1 | 8/2010 | Reche |
| 2010/0202196 A1 | 8/2010 | Lee et al. |
| 2010/0208521 A1 | 8/2010 | Kim et al. |
| 2010/0262889 A1 | 10/2010 | Bains |
| 2010/0281207 A1 | 11/2010 | Miller et al. |
| 2010/0281342 A1 | 11/2010 | Chang et al. |
| 2011/0051513 A1 | 3/2011 | Shen et al. |
| 2011/0083060 A1 | 4/2011 | Sakurada et al. |
| 2011/0113281 A1 | 5/2011 | Zhang et al. |
| 2011/0131444 A1 | 6/2011 | Buch et al. |
| 2011/0173378 A1 | 7/2011 | Filor et al. |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0228601 A1 | 9/2011 | Olbrich et al. |
| 2011/0231600 A1 | 9/2011 | Tanaka et al. |
| 2012/0096217 A1 | 4/2012 | Son et al. |
| 2012/0110250 A1 | 5/2012 | Sabbag et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0195126 A1 | 8/2012 | Roohparvar |
| 2012/0239976 A1 | 9/2012 | Cometti et al. |
| 2012/0284587 A1 | 11/2012 | Yu et al. |
| 2013/0179646 A1 | 7/2013 | Okubo et al. |
| 2013/0343131 A1 | 12/2013 | Wu et al. |
| 2014/0095775 A1 | 4/2014 | Talagala et al. |

FOREIGN PATENT DOCUMENTS

| | | |
|---|---|---|
| WO | WO 2007/036834 A2 | 4/2007 |
| WO | WO 2007/080586 A2 | 7/2007 |
| WO | WO 2008/121553 | 10/2008 |
| WO | WO 2008/121577 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
McLean, Information Technology-AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 9 pgs.
Pliant Technology, Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 8 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042775, Sep. 26, 2012, 9 pgs.
SanDisk Enterprise IP LLC, International Search Report / Written Opinion, PCT/US2012/059459, Feb. 14, 2013, 9 pgs.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005.
Zeidman, 1999 Verilog Designer's Library (04US), 9 pgs.
Canim, Buffered Bloom ilters on Solid State Storage, ADMS*10, Singapore, Sep. 13-17, 2010, 8 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
International Search Report and Written Opinion dated Mar. 7, 2014, received in International Patent Application No. PCT/US2013/074772, which corresponds to U.S. Appl. No. 13/831,218, 10 pages (George).

(56) References Cited

OTHER PUBLICATIONS

International Search Report and Written Opinion dated Mar. 24, 2014, received in International Patent Application No. PCT/US2013/074777, which corresponds to U.S. Appl. No. 13/831,308, 10 pages (George).

International Search Report and Written Opinion dated Mar. 7, 2014, received in International Patent Application No. PCT/US2013/074779, which corresponds to U.S. Appl. No. 13/831,374, 8 pages (George).

International Search Report and Written Opinion dated Jul. 25, 2014, received in International Patent Application No. PCT/US2014/029453, which corresponds to U.S. Appl. No. 13/963,444, 9 pages (Frayer).

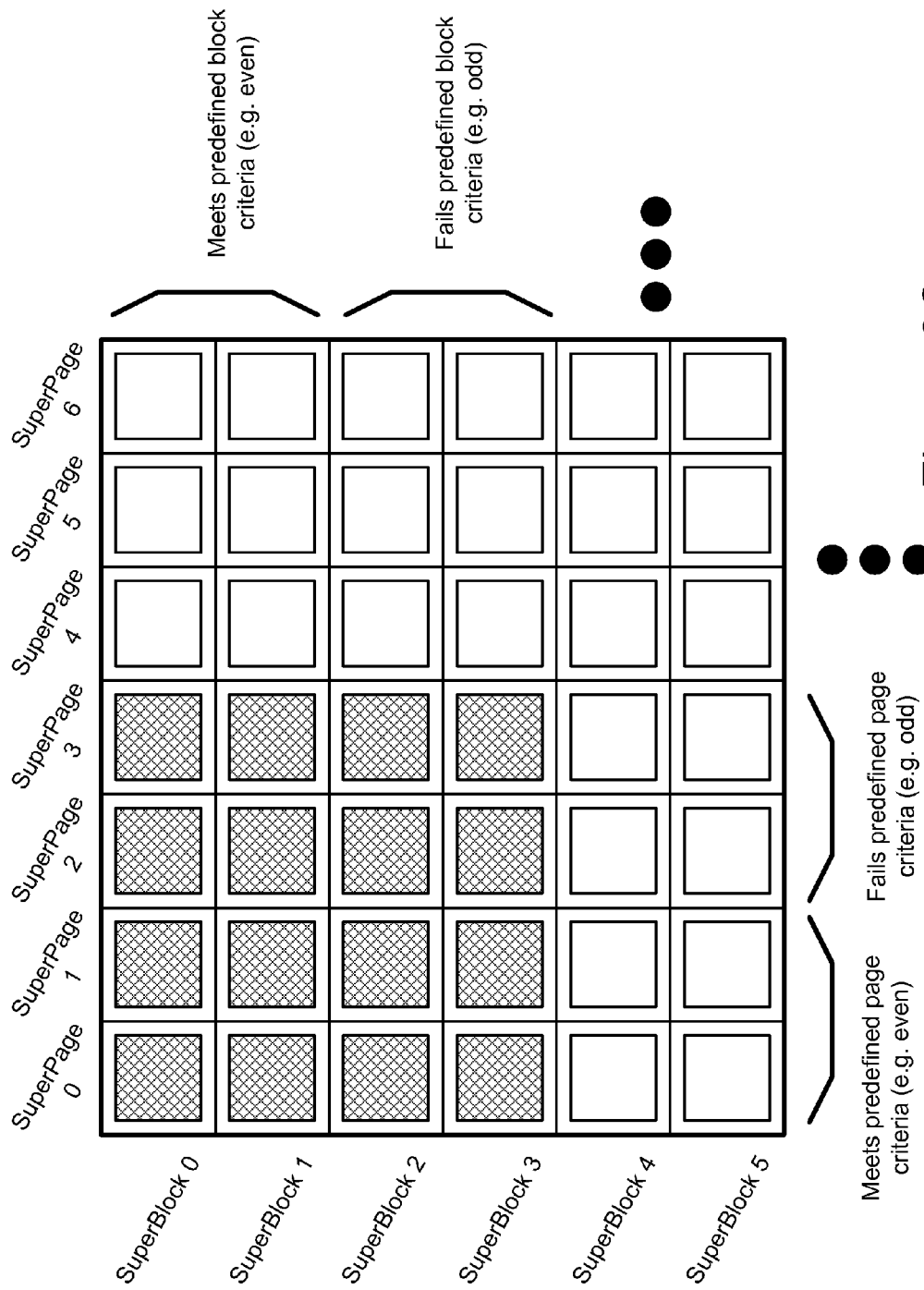

Each row check word in the quadrant comprising a value encoded with a result of a mathematical operation performed on a respective row set comprising a set of data elements corresponding to the row check word, and each diagonal check word in the quadrant comprising a value encoded with a result of a mathematical operation performed on a respective diagonal set of data elements comprising a set of data elements corresponding to the diagonal check word (C)

No more than two data elements in the row set for a respective row check word are stored in the same bank of the plurality of banks No more than one data element in the row set is stored in the same bank of the plurality of banks No more than two data elements in the diagonal set for a respective diagonal check word are stored in the same bank of the plurality of banks No more than one data element in the diagonal set is stored in the same bank of the plurality of banks A first portion of the data elements in the row set are stored in a first set of blocks, the first set of blocks comprising entirely even or odd blocks A first complementary portion of the data elements in the row set are stored in a second set of blocks, the second set of blocks comprising a set of blocks complementary to the first set of blocks and comprising entirely odd blocks or even blocks A second portion of the data elements in the row set are stored in a first set of pages, the first set of pages comprising entirely even pages or odd pages A second complementary portion of the data elements in the row set are stored in a second set of pages, the second set of pages comprising a set of pages complementary to the first set of pages and comprising entirely odd pages or even pages (D)

Figure 6D

Each row check word in the quadrant comprising a value encoded with a result of a mathematical operation performed on a respective row set comprising a set of data elements corresponding to the row check word, and ~628 each diagonal check word in the quadrant comprising a value encoded with a result of a mathematical operation performed on a respective diagonal set of data elements comprising a set of data elements corresponding to the diagonal check word (D)

A first portion of the data elements in the diagonal set are stored in the first set of blocks ~646

A first complementary portion of the data elements in the diagonal set are stored in the second set of blocks ~648

All the data elements in the diagonal set are stored in a single set of pages, the single set of pages comprising only pages in the first set of pages or only pages in the second set of pages ~650

Each row set corresponding to a respective row check word includes one or more diagonal check words from the set of diagonal check words ~652

Each diagonal set corresponding to a respective diagonal check word includes one or more row check words from the set of row check words. ~654

Figure 6E

SYSTEMS, METHODS, AND DEVICES FOR MULTI-DIMENSIONAL FLASH RAID DATA PROTECTION

RELATED APPLICATIONS

This application claims priority to U.S. Provisional Patent Application No. 61/747,779, filed Dec. 31, 2012, which is hereby incorporated by reference in its entirety.

TECHNICAL FIELD

The present disclosure relates to using error correction in memory systems, and in particular, RAID protection schemes in flash memory systems.

BACKGROUND

Non-volatile memories, such as flash memory devices, have supported the increased portability of consumer electronics, and have been utilized in relatively low power enterprise storage systems suitable for cloud computing and mass storage. The ever-present demand for almost continual advancement in these areas is often accompanied by demand to improve data storage capacity. The demand for greater storage capacity in turn stokes demand for greater storage density, so that specifications such as power consumption and form factor may be maintained and preferably reduced. As such, there is ongoing pressure to increase the storage density of non-volatile memories in order to further improve the useful attributes of such devices. However, a drawback of increasing storage density is that the stored data is increasingly prone to storage and/or reading errors, such as random retention errors, page or block loss, or failure of a chip.

In the embodiments described below, an improved method for protecting data stored in non-volatile memory devices is provided.

SUMMARY

In accordance with some embodiments, a persistent memory device includes a plurality of banks of nonvolatile memory cells. Each bank includes one or more die that are distinct from the one or more die of every other bank of the plurality of banks, and each die has a memory array having a plurality of memory blocks including equal (or substantially equal) numbers of even blocks and odd blocks. Each memory block has a plurality of pages, including equal (or substantially equal) numbers of even pages and odd pages, and stores a plurality of data elements.

Furthermore, memory in the persistent memory device is logically divided into a set of quadrants, each quadrant including, for every bank in the plurality of banks, one or more even blocks and one or more odd blocks and, for each block in the quadrant, one or more even pages and one or more odd pages.

Each quadrant of the persistent memory device stores a set of data elements, row check words and diagonal check words. Each data element is protected by one of the row check words and one of the diagonal check words, and furthermore each row check word includes a value encoded with a result of a mathematical operation performed on a respective row set comprising a set of data elements corresponding to the row check word, and each diagonal check word includes a value encoded with a result of a mathematical operation performed on a respective diagonal set comprising a set of data elements corresponding to the diagonal check word.

A high level of data protection is provided by arranging for each row set to be distributed over the banks, blocks and pages so that the failure of any one page, block or die in the quadrant does not result in the loss of any data in the quadrant (i.e., so that data lost due to any such failure is fully recoverable using the row check words and/or diagonal check words), and furthermore so that randomly or pseudo-randomly distributed data retention errors in data elements in the quadrant does not result in the loss of any data in the quadrant unless a specific predefined pattern or combination of data retention errors occurs.

BRIEF DESCRIPTION OF THE DRAWINGS

So that the present disclosure can be understood in greater detail, a more particular description is made with reference to the features of various implementations, some of which are illustrated in the appended drawings. The appended drawings, however, merely illustrate the more pertinent features of the present disclosure and are therefore not to be considered limiting.

FIGS. 3A-3C illustrate an exemplary logical organization of SuperBlocks and SuperPages into quadrants.

FIGS. 6A-6E are flow diagrams illustrating a method for multi-dimensional RAID data protection.

Figure 1:
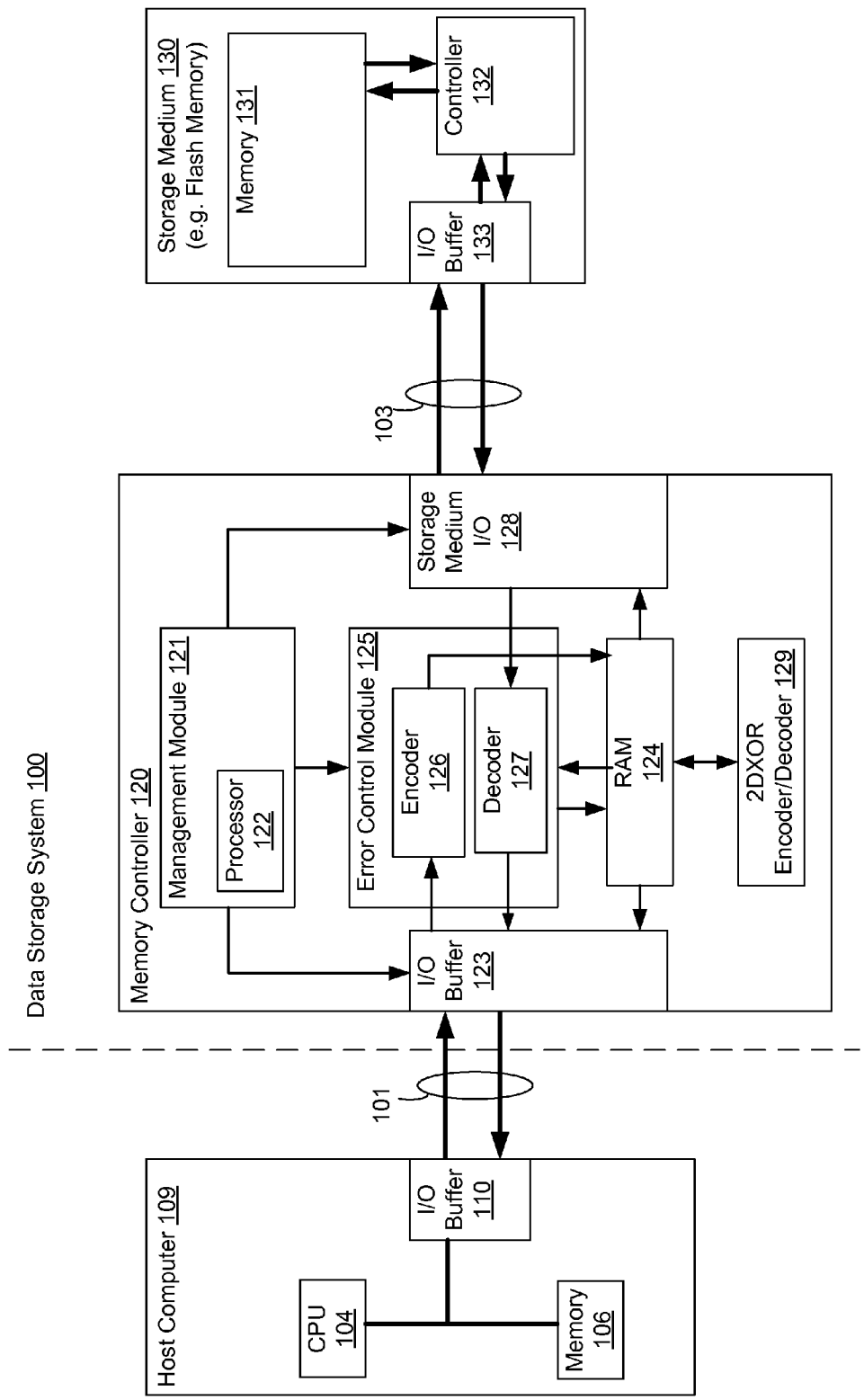
FIG. 1 is a schematic diagram of a data storage environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals are used to denote like features throughout the specification and figures.

DETAILED DESCRIPTION

A persistent memory device is provided that includes memory. The memory includes a plurality of banks of non-volatile memory cells. Each bank includes one or more die, which are distinct from the one or more die of every other bank. Each die includes a memory array having a plurality of memory blocks including even blocks and odd blocks. Each memory block has a plurality of pages, including even pages and odd pages, and stores a plurality of data elements.

Furthermore, memory in the persistent memory device is logically divided into a set of quadrants, each quadrant including, for every bank in the plurality of banks, one or more even blocks and one or more odd blocks and, for each block in the quadrant, one or more even pages and one or more odd pages. Each quadrant stores a set of row check words and a set of diagonal check words.

Furthermore, each data element in the quadrant corresponds to a single row check word of the set of row check words and a single diagonal check word of the set of diagonal check words. Each row check word in the quadrant includes a value encoded with a result of a mathematical operation performed on a respective row set comprising a set of data elements corresponding to the row check word. No more than two data elements in the row set are stored in the same bank of the plurality of banks A first portion of the data elements in the row set are stored in a first set of blocks that are entirely even block or odd blocks. A first complementary portion of the data elements in the row set are stored in a second set of blocks, the second set of blocks including a set of blocks complementary to the first set of blocks and including entirely odd blocks or even blocks. A second portion of the data elements in the row set are stored in a first set of pages, the first set of pages comprising entirely even pages or odd pages, and a second complementary portion of the data elements in the row set are stored in a second set of pages, the second set of pages comprising a set of pages complementary to the first set of pages and comprising entirely odd pages or even pages.

Furthermore, each diagonal check word in the quadrant includes a value encoded with a result of a mathematical operation performed on a respective diagonal set of data elements comprising a set of data elements corresponding to the diagonal check word. No more than two data elements in the diagonal set are stored in the same bank of the plurality of banks A first portion of the data elements in the diagonal set are stored in the first set of blocks. A first complementary portion of the data elements in the diagonal set are stored in the second set of blocks and all of the data elements in the diagonal set are stored in a single set of pages, the single set of pages including only pages in the first set of pages or only pages in the second set of pages.

In some other embodiments, a persistent memory device is defined as above, except that a second portion of the data elements in the diagonal set are stored in a first set of pages, the first set of pages comprising entirely even pages or odd pages, and a second complementary portion of the data elements in the diagonal set are stored in a second set of pages, the second set of pages comprising a set of pages complementary to the first set of pages and comprising entirely odd pages or even pages. In addition, in these embodiments, all the data elements in the row set are stored in a single set of pages, the single set of pages comprising only pages in the first set of pages or only pages in the second set of pages.

Below, FIGS. 1-4 illustrate aspects of exemplary memory devices for use in implementing the method described with reference to FIGS. 6A-6E.

FIG. 1 is a diagram of an implementation of a data storage system 100 used in conjunction host computer 109. While certain specific features are illustrated, those skilled in the art will appreciate from the present disclosure that various other features have not been illustrated for the sake of brevity, and so as not to obscure more pertinent aspects of the example implementations disclosed herein. To that end, as a non-limiting example, data storage system 100 includes memory controller 120 and storage medium 130 (e.g., a flash memory device).

Host system 109 is coupled to memory controller 120 through I/O buffer 110 and data connections 101. Those skilled in the art will appreciate from the present disclosure that, in some implementations, host system 109 includes memory controller 120 as a component. Generally, host system 109 includes any suitable computer device, such as a computer server, a desktop computer, a laptop computer, a tablet device, a netbook, an internet kiosk, a personal digital assistant, a mobile phone, a smart phone, a gaming device, or any other computing device. Host system 109 includes one or more processors such as central processing units (CPU) 104, one or more types of memory (represented by memory 106 in FIG. 1), a display and/or other user interface components such as a keyboard, a touch screen display, a mouse, a track-pad, a digital camera and/or any number of supplemental devices to add functionality.

Storage medium 130 is coupled to memory controller 120 through connections 103 and I/O buffer 133. Connections 103 are sometimes called data connections, but typically convey commands in addition to data, and optionally convey metadata, error correction information and/or other information in addition to data values to be stored in storage medium 130 and data values read from storage medium 130. Moreover, those skilled in the art will appreciate from the present disclosure that in various implementations memory controller 120 and storage medium 130 are included in the same device as components thereof. Storage medium 130 includes any number (i.e., one or more) of memory devices including, without limitation, non-volatile semiconductor memory devices (e.g., memory 131), such as flash memory. Storage medium 130 also optionally includes a low-level memory controller 132. For example, flash memory devices can be configured for enterprise storage suitable for applications such as cloud computing, or for caching data stored (or be stored) in secondary storage, such as hard disk drives. Additionally and/or alternatively, flash memory devices can also be configured for relatively smaller-scale applications such as personal flash drives or hard-disk replacements for personal, laptop and tablet computers. In some implementations, storage medium 130 comprises one or more flash memory devices. In some implementations, storage medium 130 comprises at least one of NAND-type flash memory and NOR-type flash memory.

Storage medium 30 is divided into a number of addressable and individually selectable blocks, such as selectable portion 131. In some implementations the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible portion in a block. However, in some implementations (e.g., using some types of flash memory) the minimum unit of accessible data is a sector, which is subunit of a page. That is, block includes multiple pages, each page contains a plurality of sectors, and each sector is the minimum unit of data for data writing or reading to the flash memory device.

In some embodiments, each page contains either a plurality of data elements or a plurality of check words (row check words or diagonal check words). In some embodiments, each of the data elements is (or includes) a codeword that includes both data and parity elements. In some embodiments, codewords are individually protected data elements (e.g., the codewords are encoded using BCH or LDPC during write operations, and are decoded during read operations). For ease of explanation, embodiments are hereinafter described with reference to "codewords." However, those skilled in the art will recognize that the systems, methods, and devices described herein can be generalized to more generic data elements.

In some embodiments, a block of data includes a number of pages, and each page includes either a number of codewords or a number of check words. For purposes of this disclosure, check words (i.e., row check words and diagonal check words) each have the same size as codewords (or, alternatively, data elements), but are not codewords (or data elements). For example, in some implementations, one block includes 64 pages, 128 pages, 256 pages, or another suitable number of pages. The respective sizes of blocks, pages and codewords are often a matter of design choice, and often differ across a wide range of enterprise and consumer devices. In another example, and without limitation, in some applications a codeword includes anywhere from 256 bytes to 544 bytes. That range may be extended upward or downward, and/or shrink or expand depending on a particular application.

In some implementations, memory controller 120 includes management module 121, I/O buffer 123, storage medium I/O 128, and error control module 125. Those skilled in the art will appreciate from the present disclosure that memory controller 120 includes various additional features that have not been illustrated for the sake of brevity, and so as not to obscure more pertinent features of the example implementations disclosed herein, and that a different arrangement of features may be possible.

Input and output buffers 123, 110 provide an interface to host system 109 through data connections 101. Similarly, storage medium I/O 128 provides an interface to storage medium 130 though data connections 103. In some implementations, storage medium I/O 128 includes read and write circuitry.

In some implementations, management module 121 includes a processor 122 configured to execute instructions in one or more programs, e.g., programs in management module 121. However, those skilled in the art will appreciate from the present disclosure that, in some implementations, processor 122 is shared by one or more components within, and in some cases, beyond the function of memory controller 120. Management module 121 is coupled to input and output buffers 123, 110, error control module 125 and storage medium I/O 128 in order to coordinate the operation of these components. In some implementations, the operations performed by 2DXOR encoder/decoder 129 are performed instead by processor 122. In some implementations, operations performed by 2DXOR encoder/decoder 129 are performed by a specialized processor.

Error control module 125 is coupled between storage medium I/O 128 and input and output buffer 123. In some implementations, error control module 125 is provided to limit the number of uncorrectable errors inadvertently introduced into data. To that end, error control module 125 includes encoder 126 and decoder 127. Encoder 126 encodes data using an error control code such as BCH or LDPC to produce a codeword, which is subsequently stored in storage medium 130. When the encoded data is read from storage medium 130, decoder 127 applies a decoding process to recover the data, and correct errors within the error correcting capability of the error control code. Error control module 125 is also coupled with RAM 124 and 2DXOR Encoder/Decoder 129, whose operation will be described in greater detail below. Those skilled in the art will appreciate from the present disclosure that various error control codes have different error detection and correction capacities, and that particular codes are selected for various applications for reasons beyond the scope of this disclosure. As such, an exhaustive review of the various types of error control codes is not provided herein for the sake of brevity. Moreover, those skilled in the art will appreciate that each type or family of error control codes may have encoding and decoding algorithms that are particular to the type or family of error control codes. On the other hand some algorithms, such as the Viterbi algorithm, may be utilized at least to some extent in the decoding of a number of different types or families of error control codes. So again, for the sake of brevity, an exhaustive description of the various types of encoding and decoding algorithms generally available and known to those skilled in the art is not provided herein.

During a write operation, input buffer 123 receives data to be stored in storage medium 130 from host system 109. Data in input buffer 123 is made available to encoder 126, which encodes the data to produce a codeword. The codeword is made available to storage medium I/O 128, which transfers the codeword to storage medium 130 in a manner dependent on the type of storage medium being utilized. During a read operation for the same data, storage medium I/O 128 accesses the portion of storage medium 130 in which the corresponding codeword is stored so as to read the codeword, and provides the codeword to decoder 127. When decoding by decoder 127 is successful, the resulting decoded data is provided to I/O buffer 123, where the decoded data is made available to host system 109. In some embodiments, when the decoding is not successful, memory controller 120 transfers from storage medium 130 data read from an entire quadrant, the quadrant including the codeword that was not successfully decoded, to 2DXOR Encoder/Decoder 129 for 2D XOR recovery, as described in greater detail below.

Figure 2:
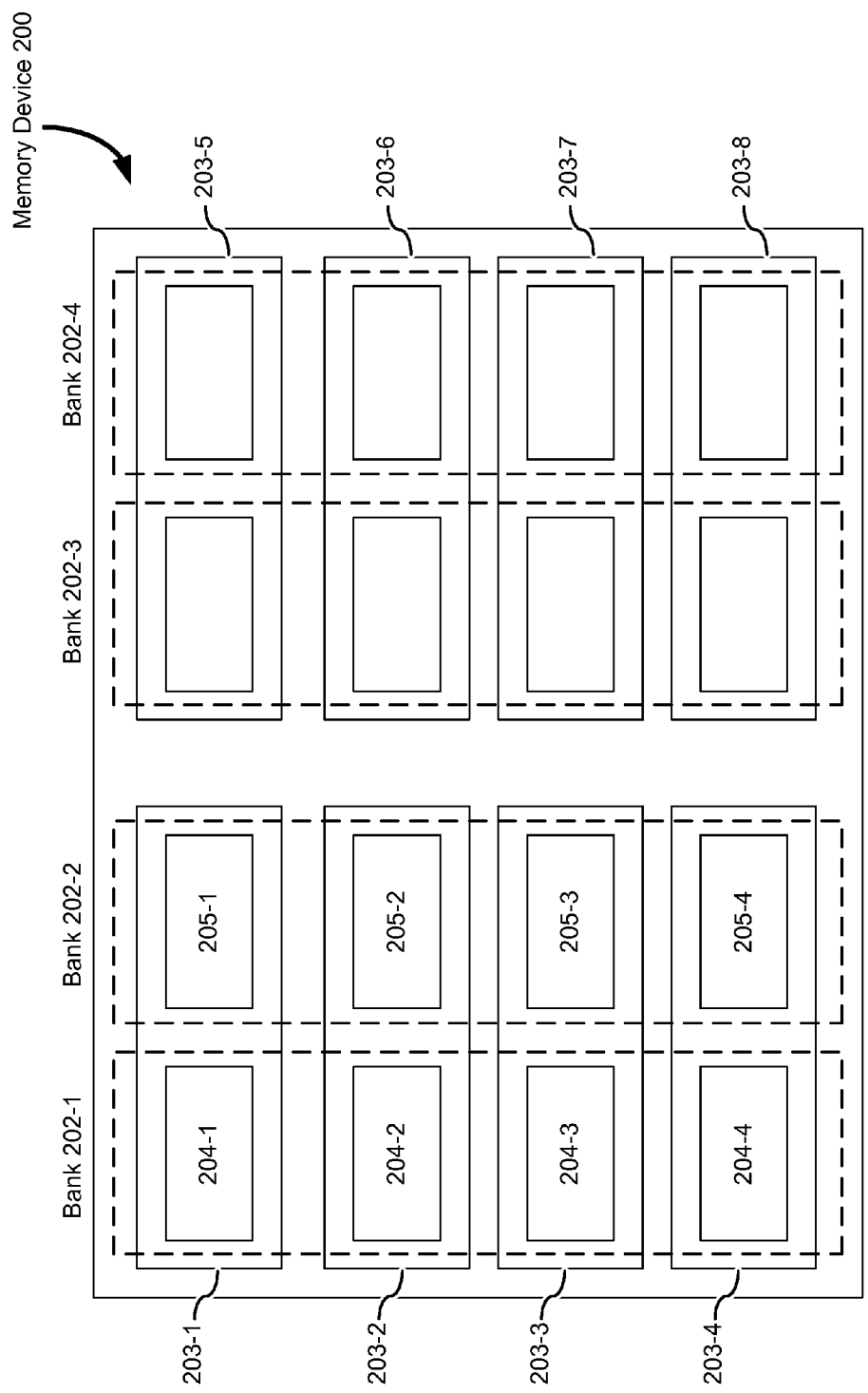
FIG. 2 illustrates an exemplary organization of a memory device.
Figure 4:
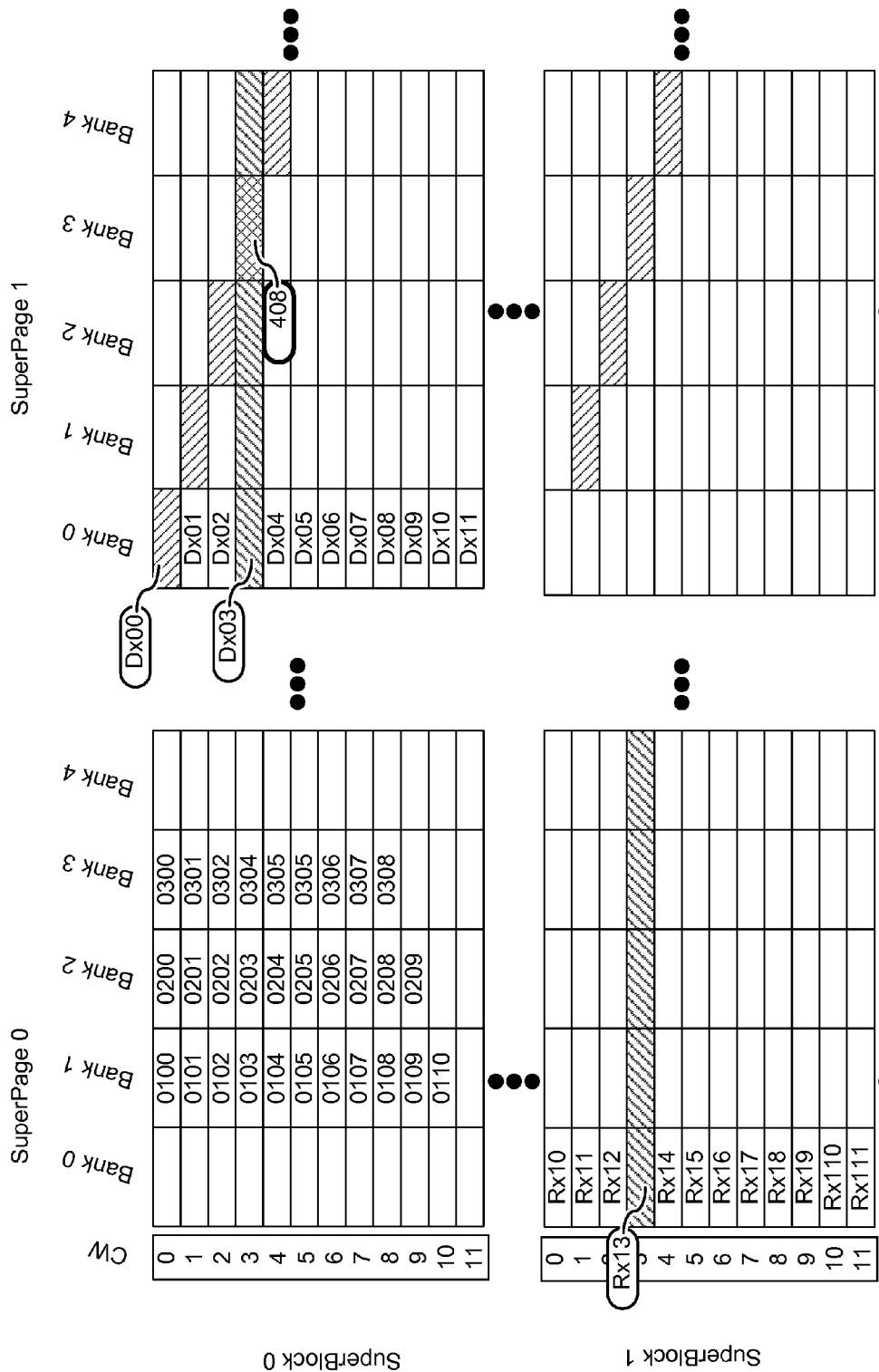
FIG. 4 illustrates an exemplary quadrant.

FIG. 2 in conjunction with FIG. 4 illustrates an exemplary organization of a memory device 200 (e.g., memory 131, FIG. 1, or a portion thereof). Memory device 200 includes one or more chips 203, each of which includes one or more die 204, 205. Memory device 200 is logically organized into logical banks 202 (e.g., logical banks 202-1, 202-2, etc.). Each logical bank 202 comprises a set of die that includes one or more die. In some embodiments, the respective set of die in a particular logical bank is disjoint (i.e., non-overlapping) from the set of die in any different logical bank. In some implementations, blocks within a respective bank are assigned a logical block addresses ranging from 0 to Nd−1, where N is the number of blocks per die (e.g., 256) and d is the number of die per bank. A particular block is then uniquely identified by block and bank number (e.g., block 27 of bank 202-3). This organization lends itself to the construction of logical SuperBlocks, which, in some embodiments, include the same block on each bank in memory device 200 (e.g., SuperBlock 0 includes block 0 from bank 202-1, block 0 from bank 202-2, and so on). This organization also lends itself to the construction of logical SuperPages, which, in some embodiments, include the same page in each block included in a SuperBlock (e.g., SuperPage 0 of SuperBlock 0 includes page 0 of block 0 from bank 202-1, page 0 of block 0 from bank 202-2, and so on). It will be apparent to those of skill in the art that aspects of the preceding organization of memory device 200 are merely exemplary, including: the number of die per chip, the number of die per bank, the number of banks, the number of blocks per bank, the number of pages per block, and so on.

Figure 3A:
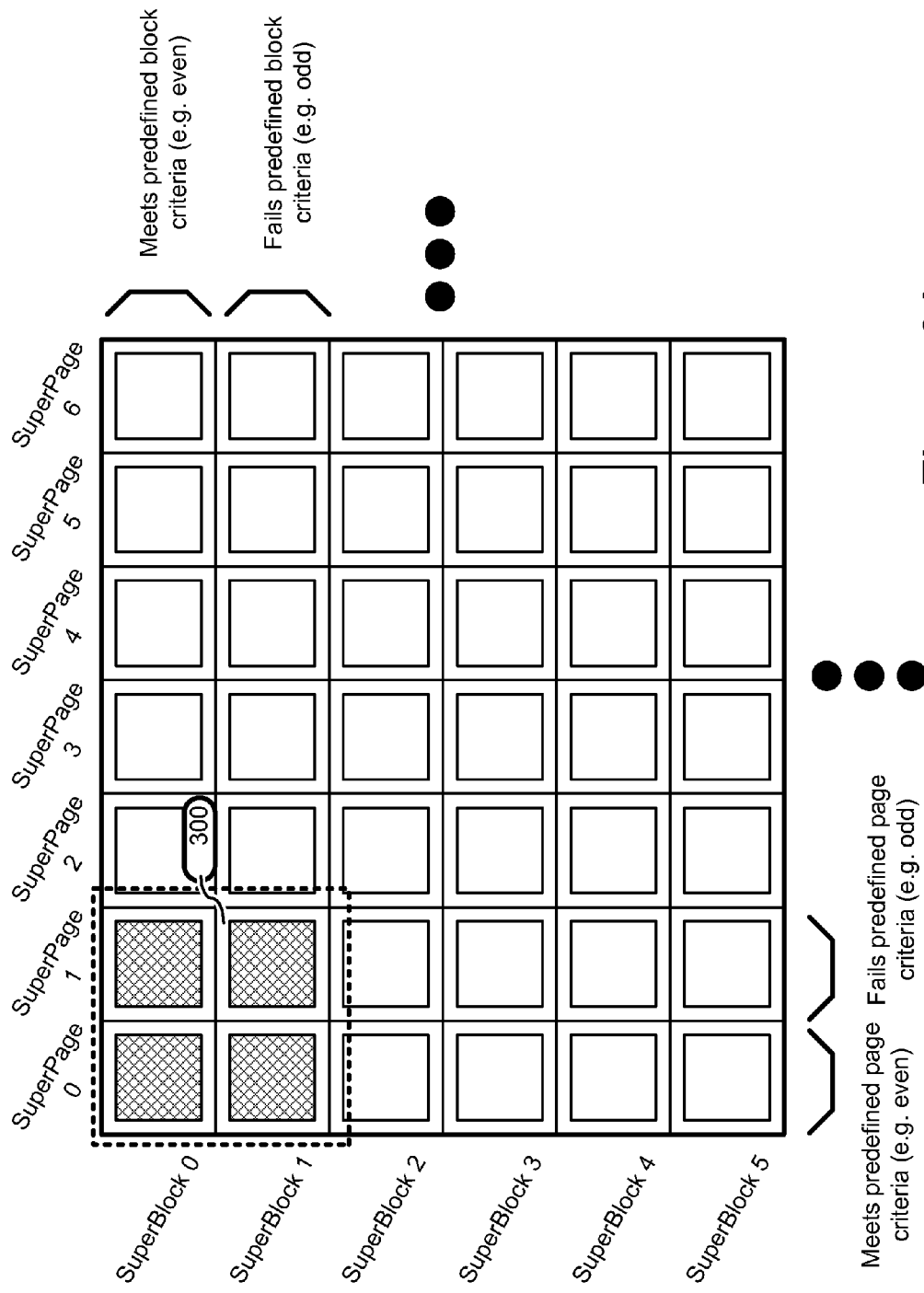
Figure 3B:
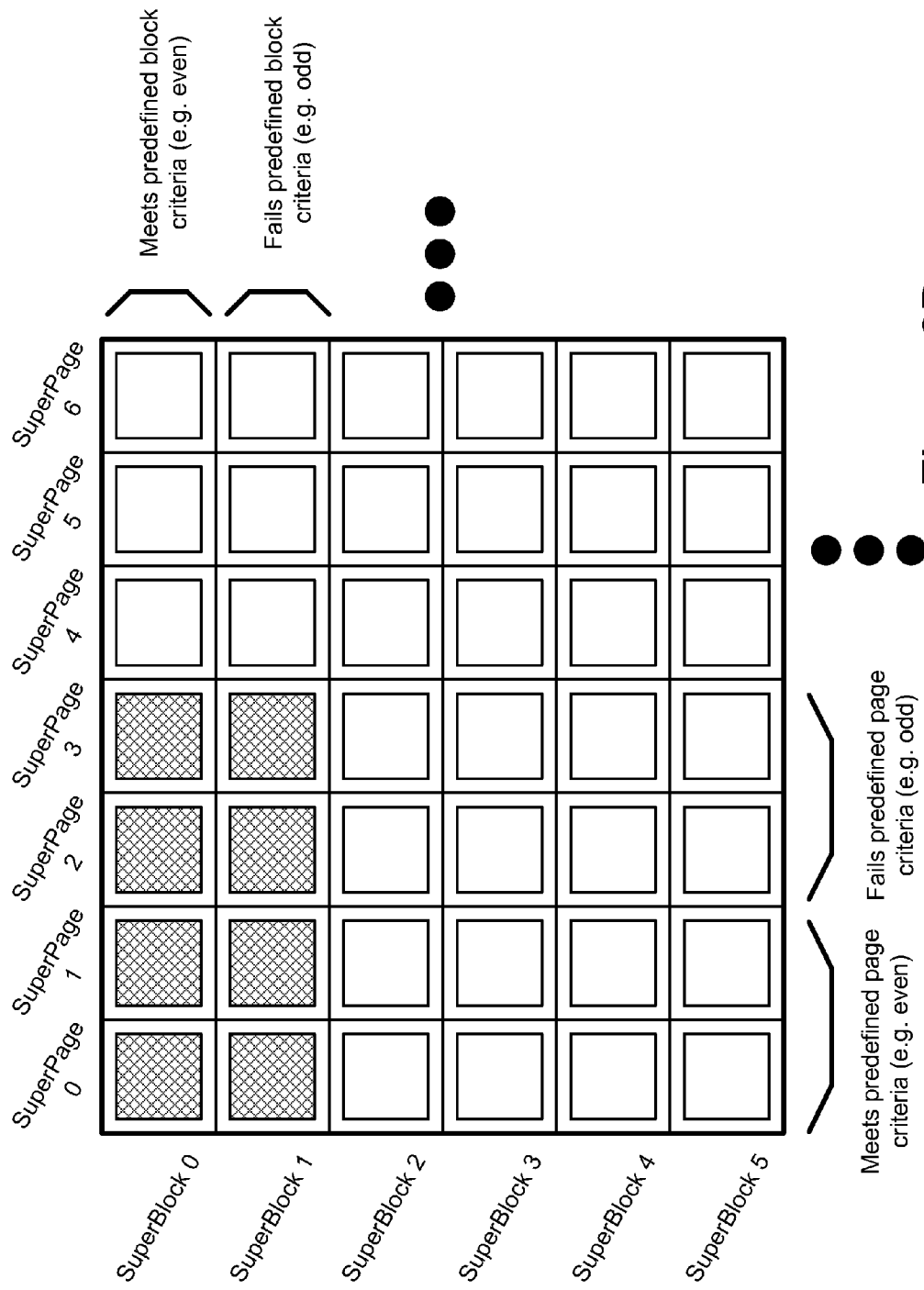

FIGS. 3A-3C illustrate exemplary logical organizations of SuperBlocks and SuperPages into quadrants.

FIG. 3A illustrates a plurality of SuperBlocks and their corresponding SuperPages. In some embodiments, the blocks in a respective SuperBlock are designated "even" or "odd" based on predefined block designation criteria. In some embodiments, the predefined block designation criteria are met for a respective block when a predefined respective bit in the block address for the respective block is equal to a predetermined value (e.g., "0" or "1"). In some embodiments, each block has an assigned block number and the predefined block designation criteria include that the block number modulo two value is equal to a first predefined value (e.g., "0" or "1"). For example, when the first predefined value is "0" and SuperBlock 4 includes block 4 in every bank of the memory device, each block in SuperBlock 4 is designated an even block. Thus, in this exemplary manner, each SuperBlock is collection of entirely even or odd blocks. In some embodiments, pages are designated as even or odd pages in an analogous manner, as described in more detail with reference to method 600.

In some embodiments, memory is divided logically into quadrants, each quadrant including an equal number of even and odd blocks and an equal number of even and odd pages. For example, in FIG. 3A, a quadrant 300 includes SuperPage 0 and SuperPage 1 from SuperBlock 0 and SuperBlock 1, respectively. SuperBlock 0, in this example, includes entirely even blocks (by virtue of meeting predefined block criteria, also referred to as predefined block designation criteria). SuperBlock 1 includes entirely odd blocks (by virtue of not meeting the predefined block criteria). SuperPage 0 (of either SuperBlock) includes entirely even pages (by virtue of meeting predefined page criteria, also referred to as predefined page designation criteria). SuperPage 1 (of either SuperBlock) includes entirely odd pages (by virtue of not meeting the predefined page criteria). An example of the predefined block criteria used to create this quadrant is that the least significant bit of each respective block address is equal to "0." An example of the predefined page criteria used to create this quadrant is that the least significant bit of each respective page address is equal to "0." The manner in which SuperBlocks are paired within a quadrant is a design decision. For example, in this case, SuperBlock 0 is paired with SuperBlock 1 because they are adjacent. However, for example, SuperBlock 0 could have been paired with SuperBlock 3, while SuperBlock 2 could be paired with SuperBlock 1. Likewise, the manner in which SuperPages are paired within a quadrant is similarly a design decision.

FIG. 3B illustrates an alternative embodiment of a quadrant. An example of the predefined block criteria used to create this quadrant is that the least significant bit of each respective block address is equal to "0." An example of the predefined page criteria used to create this quadrant is that the second least significant bit of each respective page address is equal to "0".

FIG. 3C illustrates an alternative embodiment of a quadrant. An example of the predefined block criteria used to create this quadrant is that the second least significant bit of each respective block address is equal to "0". An example of the predefined page criteria used to create this quadrant is that the second least significant bit of each respective page address is equal to "0".

In some embodiments, it is convenient to perform reading and writing operations with respect to an entire quadrant. For example, a device reads an entire quadrant at once and stores the resulting data in storage medium I/O 128 or RAM 124 (FIG. 1). As another example, a device writes an entire quadrant at once by storing data for the quadrant in RAM 124 (FIG. 1) and then writing that data to the quadrant in storage medium 130. Optionally, the data stored in RAM 124 is routed through encoder 126 of error control module 125, so as to add error correction codes to the data and thereby form complete code words, and then the resulting encoded data is written to storage medium 130 via storage medium I/O 128.

FIG. 4 illustrates an exemplary quadrant storing a set of row check words and a set of diagonal check words. Each codeword in the quadrant corresponds to a single row check word of the set of row check words and a single diagonal check word of the set of diagonal check words. Each row check word in the quadrant is encoded with a value that is a result of a mathematical operation performed on a respective row set comprising a set of codewords corresponding to the row check word (e.g., a mathematical operation performed by 2DXOR Encoder/Decoder 129). Similarly, each diagonal check word in the quadrant is encoded with a value that is a result of a mathematical operation performed on a respective diagonal set comprising a set of codewords corresponding to the diagonal check word (e.g., with 2DXOR Encoder/Decoder 129). In the example shown in FIG. 4, codeword 408 corresponds to row check word Rx13 and diagonal check word Dx03. Stated another way, codeword 408 is a codeword in the row set for row check word Rx13 and is also a codeword in the diagonal set for diagonal check word Dx03.

As noted above, in this disclosure the row check words and diagonal check words are not codewords. Furthermore, in some embodiments, the row check words are not included in the diagonal set for any diagonal check word, and the diagonal check words are not included in the row set for any row check word. However, in some other embodiments, even though diagonal check words are not codewords, the row set for each row check word includes one diagonal check word in addition to a set of codewords, while the diagonal set for each diagonal check word includes only codewords. This latter set of embodiments is what is shown in FIG. 4, with the row set for row check word Rx13 including diagonal check word Dx03, but the diagonal set for each diagonal check word including only codewords. In yet other embodiments, the diagonal set for each diagonal check word includes one diagonal check word in addition to a set of codewords, while the row set for each row check word includes only codewords. The latter two sets of embodiments have the advantage that half the check words (either the diagonal check words, or the row check words, but not both) are protected by the other check words, which incrementally improves error correction performance of the data storage system.

Every codeword stored in the quadrant is recoverable using a first level data correction methodology in conjunction with first level error-correction codes (e.g., BCH or LDPC parity values) embedded in the codeword, or if the first level data correction fails, by using a second level data correction methodology such as the inverse XOR operation described with reference to FIG. 5A-5C in conjunction with the row check word or diagonal check word corresponding to the codeword requiring recovery, or a combination thereof, unless the quadrant stores at least four codewords (i.e., a first, second, third and fourth codewords), that are not correctable using the first level data correction methodology and the following conditions are met: the first codeword and second codeword are members of the set of codewords corresponding to a first diagonal check word, the first codeword and third codeword are members of the set of codewords corresponding to a first row check word, the third codeword and fourth codeword are members of the set of codewords corresponding to a second diagonal check word distinct from the first diagonal check word, and the second codeword and fourth codewords are members of the set of codewords corresponding to a second row check word distinct from the first row check word. As a result, randomly or pseudo-randomly distributed data retention errors in the quadrant do not result in the loss of any data in the quadrant unless the aforementioned specific predefined pattern or combination of data retention errors occurs.

Figure 5C:
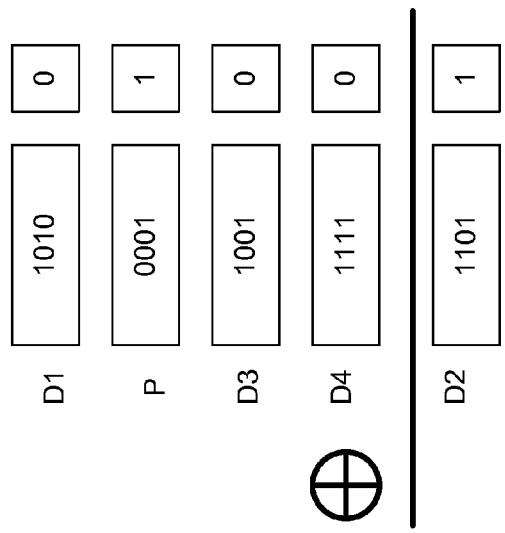
FIGS. 5A-5C illustrates an example of using XOR operations to produce a parity check word and recover a corrupted data element.
Figure 5B:
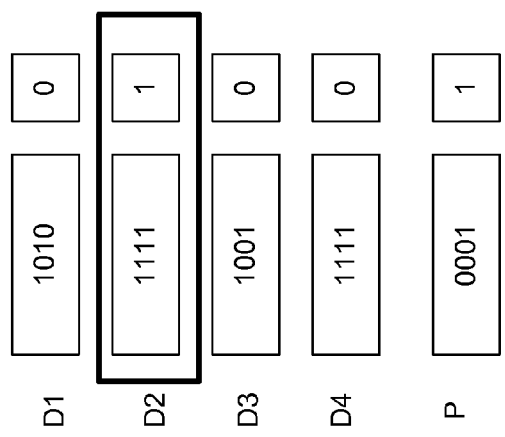
Figure 5A:
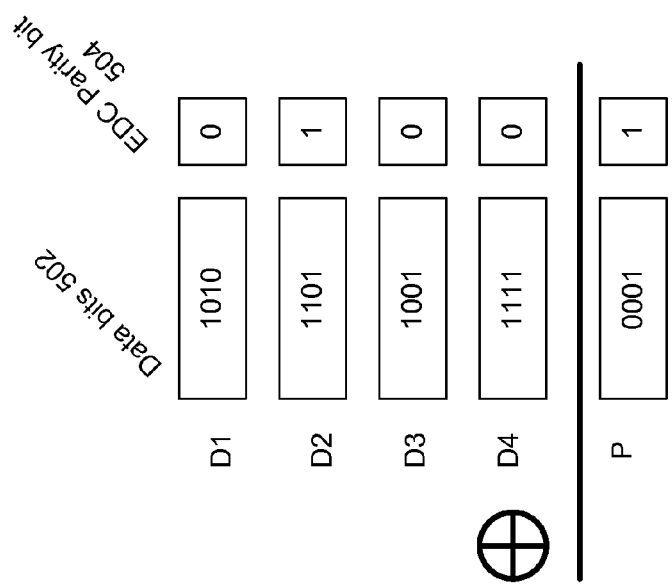
Figure 6A:
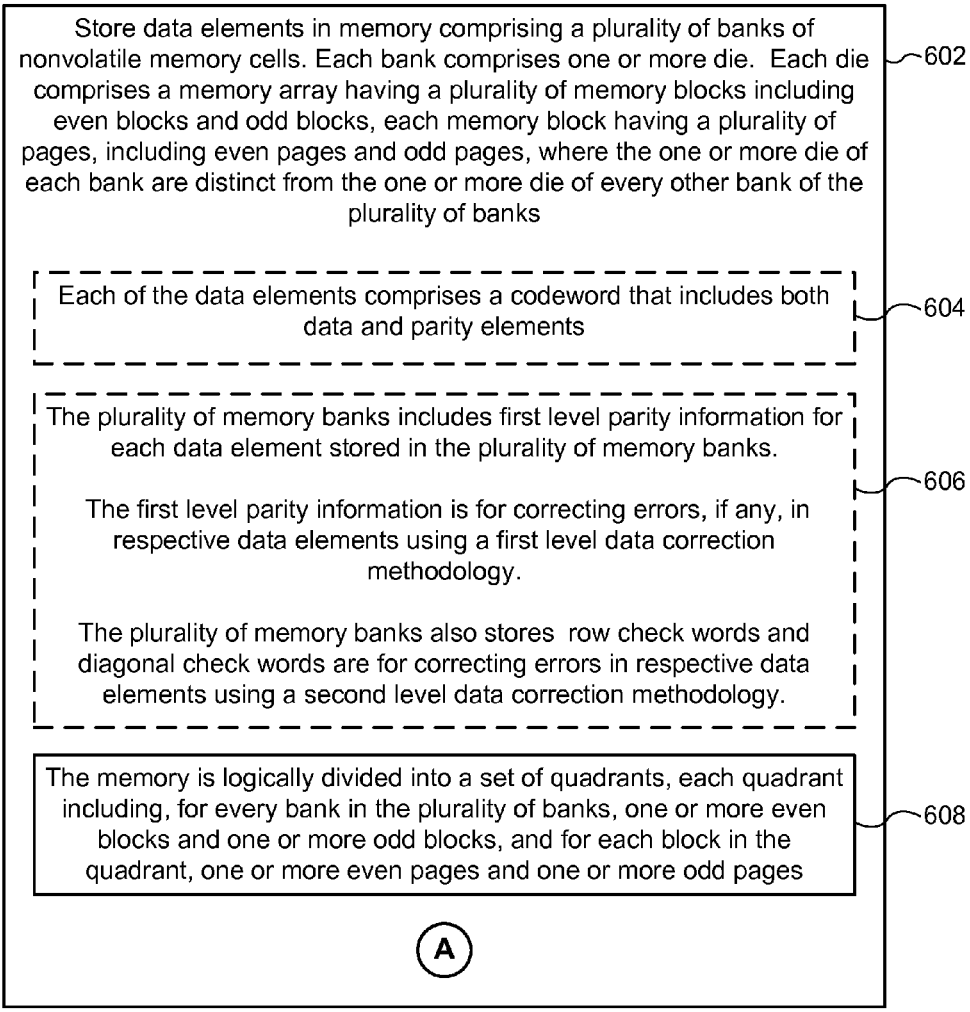
Figure 6B:
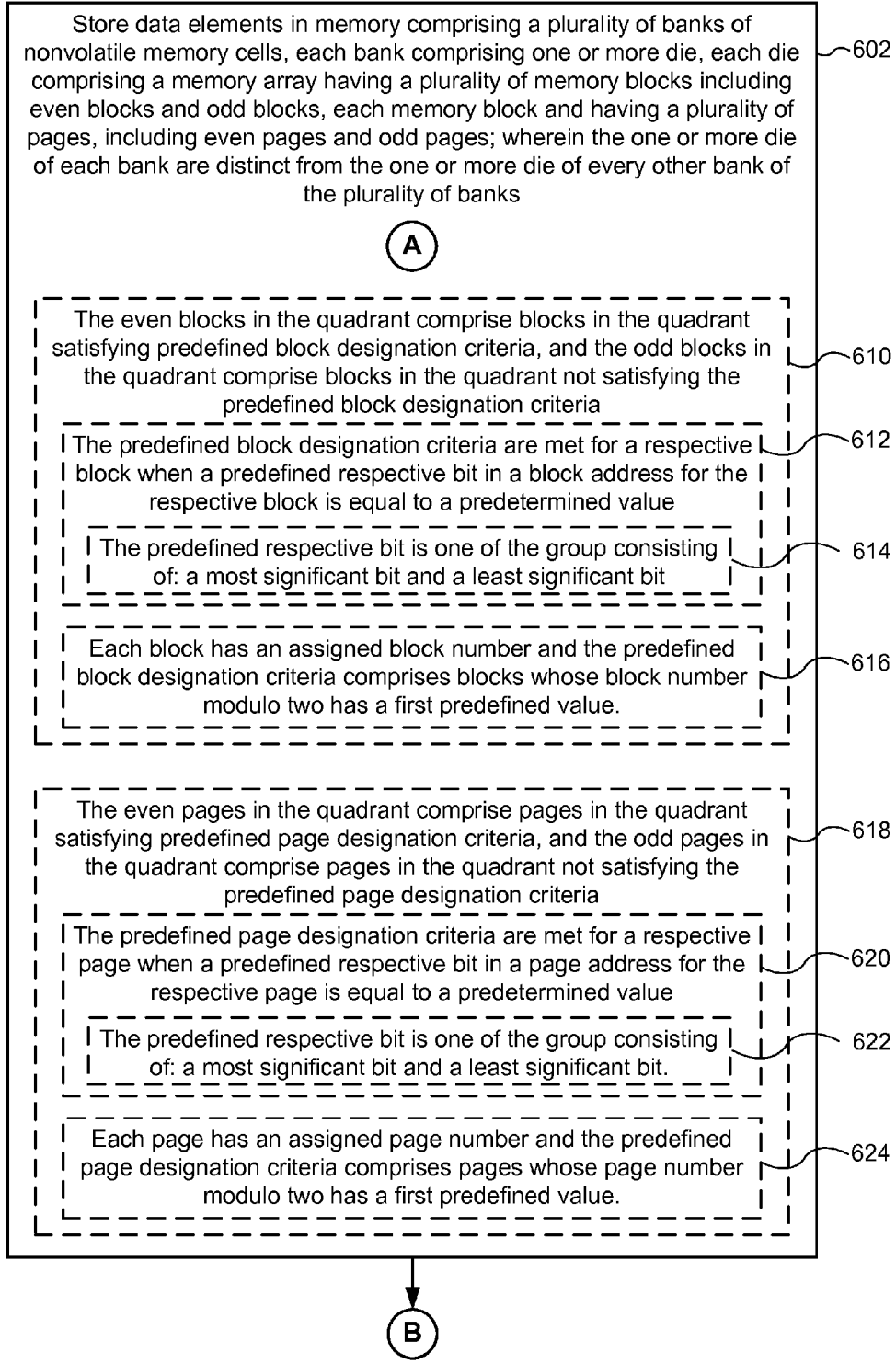
Figure 6C:
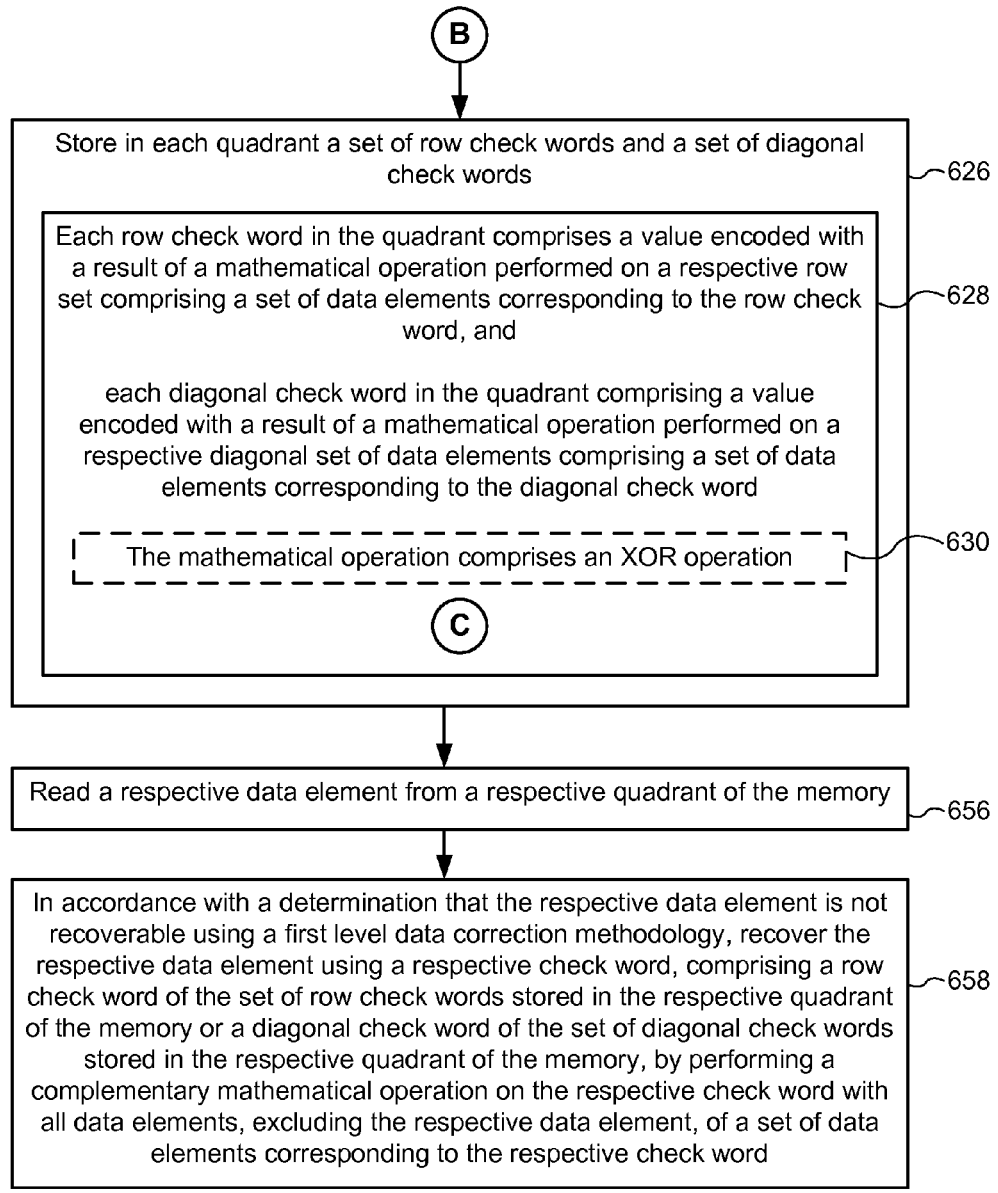

FIG. 5A-5C illustrates an example of an XOR technique to recover a corrupted codeword that is unrecoverable using first level error correction methodology. In FIG. 5A, prior to corruption (e.g., when data is first written) a set of data elements D={D1,D2,D3,D4} are XORed together and the result is stored in a parity check word P. In FIG. 5B, a corrupted codeword D2 is detected (e.g., using an error-detecting code embedded in D2). In FIG. 5C, D2 is recovered by XORing the set D2 (recovered)={D1,D3,D4,P}. Further details of this example are described with reference to operation 656 of method 600, described with reference to FIGS. 6A-6E.

FIGS. 6A-6E are flow diagrams illustrating a method 600 for multi-dimensional RAID data protection. In some embodiments, various operations in method 600 are performed at a memory device (e.g., storage medium 130 in data storage system 100, FIG. 1). In some embodiments, various operations in method 600 are performed at a memory controller 120 coupled to a storage medium 130. Some operations in method 600 are, optionally, combined and/or the order of some operations is, optionally, changed. For ease of explanation, embodiments described with reference to method 600 are described with reference to a single data storage system 100 ("the device") having a memory controller. The data storage system optionally includes specialized processors to, for example, perform mathematical operations, such as the mathematical operations for performing encoding and decoding of data using a first level error encoding and correction methodology (e.g., BCH or LDPC), and/or for performing encoding and recovery of data using the second level error encoding and recovery methodology (e.g., 2DXOR).

As described below, the method 600 provides multi-dimensional RAID data protection for persistent memory devices. The method can recover data that would otherwise be lost due to a large number of random retention errors, e.g., random retention errors associated with a storage medium having one or more die nearing the end of their useful life. The method can also recover data in the event of at least a single page loss, a single bank loss, or a single chip/die loss. The method therefore increases the reliability of persistent memory devices, increasing their lifetimes and therefore decreasing cost to users.

The device stores (602) data elements in memory having a plurality of banks of nonvolatile memory cells. Each bank has one or more die. Each die has a memory array that includes a plurality of memory blocks including even blocks and odd blocks, each memory block having a plurality of pages, including even pages and odd pages, where the one or more die of each bank are distinct from the one or more die of every other bank of the plurality of banks In some embodiments, each of the data elements is (604) a codeword that includes both data and parity elements. For example, in some very simple implementations, a single parity bit (e.g., parity bits 504, FIG. 5A) corresponding to a codeword is used to ensure that the number of bits with the value one in a codeword is even or odd. For example, when a codeword comprises 4 data bits with values "1001", an even parity bit is set to "0" (e.g., to ensure an even number of "1's" in the sequence "10010," which has two "1's" including the parity bit). As another example, when a codeword comprises 4 data bits set to "1011", an even parity bit is set to "1" (e.g., to ensure an even number of "1's" in the sequence "10111," which now has four "1's" including the parity bit). It bears noting that codewords are normally much larger (in the range of kilobytes) and that this example has been provided for simplicity of explanation. Furthermore, in some embodiments, the number of data "0's" is used in lieu of the number of data "1's" in determining the parity. The device can, in certain circumstances, determine when a codeword has been corrupted (e.g., when an odd number of bits in the codeword are corrupted, the device is able to detect that the parity bit is incorrect) and attempt to recover the bit. While a simple scheme has been described above, more sophisticated data correction schemes (e.g., BCH, LDPC, etc.) should be considered within the scope of the current disclosure. Such schemes optionally include cyclic redundancy checks, checksums, cryptographic hash functions and the like.

In some embodiments, the plurality of memory banks includes (606) first level parity information for each data element stored in the plurality of memory banks. The first level parity information is for correcting errors, if any, in respective data elements using a first level data correction methodology. For example, in some embodiments, the first level parity information is an error-correction code such as BCH or LDPC. The plurality of memory banks also stores row check words and diagonal check words for correcting errors in respective data elements using a second level data correction methodology, as described below.

The memory is logically divided (608) into a set of quadrants, each quadrant including, for every bank in the plurality of banks, one or more even blocks and one or more odd blocks, and for each block in the quadrant, one or more even pages and one or more odd pages.

In some embodiments, the even blocks in the quadrant comprise (610) blocks in the quadrant satisfying predefined block designation criteria, and the odd blocks in the quadrant comprise blocks in the quadrant not satisfying the predefined block designation criteria. In some embodiments, the predefined block designation criteria are met (612) for a respective block when a predefined respective bit in a block address for the respective block is equal to a predetermined value. In some embodiments, the predefined respective bit is (614) one of the group consisting of: a most significant bit (MSB) and a least significant bit (LSB). For example, in some implementations, the predefined block designation criteria are met for a respective block when the MSB in a block address for the respective block is equal to 0. In this case, if block addresses consist of 4 bits (a simplified example) the following block addresses are examples of even blocks using a little endian scheme: 0000, 0010, 0100, 0001. As another example, in some implementations, the predefined block designation criteria are met for a respective block when the LSB in a block address for the respective block is equal to 0. In this case, if block addresses consist of 4 bits (a simplified example) the following block addresses are examples of even blocks using a little endian scheme: 1000, 1010, 1100, 1110.

In some embodiments, each block has (616) an assigned block number (e.g., a logical value) and the predefined block designation criteria comprises blocks whose block number modulo two has a first predefined value. For example, in some implementations, the first predefined value is 1. In this example, blocks with respective block number equal to 7, 63, and 2011 are all examples of even blocks. As another example, in some implementations, the first predefined value is 0. In this additional example, blocks with respective block number equal to 6, 62, and 2012 are all examples of even blocks.

In some embodiments, the even pages in the quadrant comprise (618) pages in the quadrant satisfying predefined page designation criteria, and the odd pages in the quadrant comprise pages in the quadrant not satisfying the predefined page designation criteria. In some embodiments, the predefined page designation criteria are met (620) for a respective page when a predefined respective bit in a page address for the respective page is equal to a predetermined value. In some embodiments, the predefined respective bit is (622) one of the group consisting of: a most significant bit (MSB) and a least significant bit (LSB). For example, in some implementations, the predefined page designation criteria are met for a respective page when the MSB in a page address for the respective page is equal to 0. In this case, if page addresses consist of 4 bits (a simplified example) the following page addresses are examples of even pages using a little endian scheme: 0000, 0010, 0100, 0001. As another example, in some implementations, the predefined page designation criteria are met for a respective page when the LSB in a page address for the respective page is equal to 0. In this case, if page addresses consist of 4 bits (a simplified example) the following page addresses are examples of even pages using a little endian scheme: 1000, 1010, 1100, 1110.

In some embodiments, each page has (624) an assigned page number (e.g., a logical value) and the predefined page designation criteria comprises pages whose page number modulo two has a first predefined value. For example, in some implementations, the first predefined value is 1. In this example, pages with respective page number equal to 7, 63, and 2011 are all examples of even pages. As another example, in some implementations, the first predefined value is 0. In this additional example, pages with respective page number equal to 6, 62, and 2012 are all examples of even pages.

As mentioned above, the device stores (626) in each quadrant a set of row check words and a set of diagonal check words. Each row check word in the quadrant is (or includes) (628) a value encoded with a result of a mathematical operation performed on a respective row set comprising a set of data elements corresponding to the row check word, and each diagonal check word in the quadrant is (or includes) a value encoded with a result of a mathematical operation performed on a respective diagonal set comprising a set of data elements corresponding to the diagonal check word. In some embodiments, the mathematical operation is (630) an "exclusive or" (XOR) operation. For example, FIG. 4 shows an exemplary row set (e.g., the codewords with a forward slash fill pattern, including codeword 408 and excluding Rx13) corresponding to the row check word labeled "Rx13." In some embodiments, the row check word corresponding to "Rx13" is encoded with the result an XOR operation performed on all the data elements in the row set as well as the diagonal check word (DX03) in the same row as the data elements of the row set. Row check word Rx13 is not a data element and is not part of its own row set (i.e., Rx13 is not part of the row set corresponding to row check word Rx13.

No more than two data elements in the row set for a respective row check word are stored (631) in the same bank of the plurality of banks. In addition, in some embodiments, no more than one data element in the row set is stored (632) in the same bank of the plurality of banks.

Furthermore, no more than two data elements in the diagonal set for a respective diagonal check word are stored (634) in the same bank of the plurality of banks. In addition, in some embodiments, no more than one data element in the diagonal set is stored (636) in the same bank of the plurality of banks.

A first portion of the data elements in the row set are stored (638) in a first set of blocks, the first set of blocks comprising entirely even blocks or entirely odd blocks. A first complementary portion of the data elements in the row set are stored (640) in a second set of blocks, the second set of blocks comprising a set of blocks complementary to the first set of blocks and comprising entirely odd blocks or even blocks. For example, referring to FIG. 4 and assuming that "block 0" in each bank is an even block and that "block 1" in each bank is an odd block, half the data elements in the row set corresponding to Rx13 are stored in even blocks, shown in FIG. 4 in the upper half of the quadrant, and half the data elements in the same row set are stored in odd blocks, shown in FIG. 4 in the lower half of the quadrant.

A second portion of the data elements in the row set are stored (642) in a first set of pages, the first set of pages comprising entirely even pages or entirely odd pages. A second complementary portion of the data elements in the row set are stored (644) in a second set of pages, the second set of pages comprising a set of pages complementary to the first set of pages and comprising entirely odd pages or entirely even pages. For example, referring to FIG. 4 and assuming that all the pages in SuperPage 0 in each bank is an even page and that all the pages in SuperPage 1" in each bank is an odd page, half the data elements in the row set corresponding to Rx13 are stored in odd pages, shown in FIG. 4 in the upper half of the quadrant, and half the data elements in the same row set are stored in even pages, shown in FIG. 4 in the lower half of the quadrant.

A first portion of the data elements in the diagonal set corresponding to a diagonal check word are stored (646) in the first set of blocks. A first complementary portion of the data elements in the diagonal set are stored (648) in the second set of blocks. For example, half of the data elements in the diagonal set corresponding to diagonal check word Dx00 are stored in blocks in the upper half of the quadrant depicted in FIG. 4, and half are stored in block sin the low half of the quadrant. Furthermore, all data elements in the diagonal set are stored (650) in a single set of pages, the single set of pages comprising only pages in the first set of pages or only pages in the second set of pages. For example, and referring to FIG. 4 and assuming that all the pages in SuperPage 1" in each bank is an odd page, all data elements in the diagonal set corresponding to diagonal check word Dx00 are stored in odd pages, located in the right half of the quadrant depicted in FIG. 4.

In some embodiments, each row set corresponding to a respective row check word includes (652) one or more diagonal check words from the set of diagonal check words (e.g., Dx03 is included in the row set corresponding to Rx13, FIG. 4). In some other embodiments, each diagonal set corresponding to a respective diagonal check word includes (654) one or more row check words from the set of row check words.

The device reads (656) a respective data element from a respective quadrant of the memory. In accordance with a determination that the respective data element is not recoverable using a first level data correction methodology, the device recovers (658) the respective data element using a respective check word, comprising a row check word of the set of row check words stored in the respective quadrant of the memory or a diagonal check word of the set of diagonal check words stored in the respective quadrant of the memory, by performing a complementary mathematical operation on the respective check word with all data elements, excluding the respective data element, of a set of data elements corresponding to the respective check word. For example, in some implementations, a single corrupted data element in a row set is recovered by performing an XOR operation on the corresponding row check word and the N−1 row set that excludes the corrupted data element (e.g., as shown in FIG. 5C). For example, if a row set consists of data elements {D1, D2, D3, D4} and corresponds to a row check word P, then D2 is recovered by performing the operation D2=D1⊕D3⊕D4⊕P (where the ⊕ symbol indicates a bitwise XOR operator). In some implementations, a single corrupted data element in a diagonal set is recovered by performing an XOR operation on the corresponding diagonal check word and the N−1 diagonal set that excludes the corrupted data element (e.g., as shown in FIG. 5C in a manner analogous to the operations described with reference to the row set).

In some circumstances, the device recovers multiple corrupted data elements in a single quadrant (e.g., multiple data elements that cannot be recovered using first level methodology). In some circumstances, when multiple corrupted data elements exist in a single quadrant, the device recovers as many individual data elements as possible using the row check words, then recovers as many individual data elements as possible using the diagonal check words, and then repeats the process (each iteration of which may be called a cycle)

until either all corrupted data elements have been recovered, or the process completes an entire cycle that fails to recover any corrupted data elements while the quadrant continues to include one or more corrupted data elements.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A persistent memory device, comprising:
   memory comprising a plurality of banks of nonvolatile memory cells, each bank comprising one or more die, each die comprising a memory array having a plurality of memory blocks including even blocks and odd blocks, each memory block having a plurality of pages, including even pages and odd pages, and storing a plurality of data elements;
   wherein the one or more die of each bank are distinct from the one or more die of every other bank of the plurality of banks;
   wherein:
   the memory is logically divided into a set of quadrants, each quadrant including, for every bank in the plurality of banks, one or more even blocks and one or more odd blocks, and for each block in the quadrant, one or more even pages and one or more odd pages;
   each quadrant stores a set of row check words and a set of diagonal check words;
   each data element in the quadrant corresponds to a single row check word of the set of row check words and a single diagonal check word of the set of diagonal check words;
   each row check word in the quadrant comprising a value encoded with a result of a mathematical operation performed on a respective row set comprising a set of data elements corresponding to the row check word, wherein:
      no more than two data elements in the row set are stored in the same bank of the plurality of banks;
      a first portion of the data elements in the row set are stored in a first set of blocks, the first set of blocks comprising entirely even or entirely odd blocks;
      a first complementary portion of the data elements in the row set are stored in a second set of blocks, the second set of blocks comprising a set of blocks complementary to the first set of blocks and comprising entirely odd blocks or entirely even blocks;
      a second portion of the data elements in the row set are stored in a first set of pages, the first set of pages comprising entirely even pages or entirely odd pages; and
      a second complementary portion of the data elements in the row set are stored in a second set of pages, the second set of pages comprising a set of pages complementary to the first set of pages and comprising entirely odd pages or entirely even pages;
   each diagonal check word in the quadrant comprising a value encoded with a result of a mathematical operation performed on a respective diagonal set comprising a set of data elements corresponding to the diagonal check word;
      no more than two data elements in the diagonal set are stored in the same bank of the plurality of banks;
      a first portion of the data elements in the diagonal set are stored in the first set of blocks;
      a first complementary portion of the data elements in the diagonal set are stored in the second set of blocks; and
      all the data elements in the diagonal set are stored in a single set of pages, the single set of pages comprising only pages in the first set of pages or only pages in the second set of pages.

2. The persistent memory device of claim 1, wherein the even blocks in the quadrant comprise blocks in the quadrant satisfying predefined block designation criteria, and the odd blocks in the quadrant comprise blocks in the quadrant not satisfying the predefined block designation criteria.

3. The persistent memory device of claim 2, wherein the predefined block designation criteria are met for a respective block when a predefined respective bit in a block address for the respective block is equal to a predetermined value.

4. The persistent memory device of claim 3, wherein the predefined respective bit is one of the group consisting of: a most significant bit and a least significant bit.

5. The persistent memory device of claim 2, wherein each block has an assigned block number and the predefined block designation criteria comprises blocks whose block number modulo two has a first predefined value.

6. The persistent memory device of claim 1, wherein the even pages in the quadrant comprise pages in the quadrant satisfying predefined page designation criteria, and the odd pages in the quadrant comprise pages in the quadrant not satisfying the predefined page designation criteria.

7. The persistent memory device of claim 6, wherein the predefined page designation criteria are met for a respective page when a predefined respective bit in a page address for the respective page is equal to a predetermined value.

8. The persistent memory device of claim 7, wherein the predefined respective bit is one of the group consisting of: a most significant bit and a least significant bit.

9. The persistent memory device of claim 6, wherein each page has an assigned page number and the predefined page designation criteria comprises pages whose page number modulo two has a first predefined value.

10. The persistent memory device of claim 1, wherein each of the data elements comprises a codeword that includes both data and parity elements.

11. The persistent memory device of claim 1, wherein:
each row set corresponding to a respective row check word includes one or more diagonal check words from the set of diagonal check words.

12. The persistent memory device of claim 1, wherein:
each diagonal set corresponding to a respective diagonal check word includes one or more row check words from the set of row check words.

13. The persistent memory device of claim 1, wherein the mathematical operation comprises an XOR operation.

14. The persistent memory device of claim 1, wherein the plurality of memory banks includes first level parity information for each data element stored in the plurality of memory banks, the first level parity information for correcting errors, if any, in respective data elements using a first level data correction methodology, and wherein the row check words and diagonal check words are for correcting errors in respective data elements using a second level data correction methodology.

15. The persistent memory device of claim 14, wherein:
wherein every data element stored in the memory is recoverable using the first level data correction methodology, the second level data correction methodology or a combination thereof, unless:
the memory stores at least four data elements, comprising first, second, third and fourth data elements, that are not correctable using the first level data correction methodology,
the first data element and second data element are members of the set of data elements corresponding to a first diagonal check word;
the first data element and third data element are members of the set of data elements corresponding to a first row check word;
the third data element and fourth data element are members of the set of data elements corresponding to a second diagonal check word distinct from the first diagonal check word; and
the second data element and fourth data elements are members of the set of data elements corresponding to a second row check word distinct from the first row check word.

16. The persistent memory device of claim 15, wherein the first data element and second data element are both stored in the even blocks, and the third data element and fourth data element are both stored in the odd blocks; and
the first data element and second data element are both stored in a third set of pages comprising entirely even pages or entirely odd pages, and the third data element and the fourth data element are stored in a fourth set of pages comprising a set of pages complementary to the third set of pages and comprising entirely odd pages or entirely even pages.

17. The persistent memory device of claim 1, wherein no more than one data element in the row set is stored in the same bank of the plurality of banks.

18. The persistent memory device of claim 17, wherein no more than one data element in the diagonal set is stored in the same bank of the plurality of banks.

19. The persistent memory device of claim 1, wherein each die has an equal numbers of even blocks and odd blocks, and each memory block has equal numbers of even pages and odd pages.

20. A method of storing data in and recovering data from a persistent memory device, comprising:
storing data elements in memory comprising a plurality of banks of nonvolatile memory cells, each bank comprising one or more die, each die comprising a memory array having a plurality of memory blocks including even blocks and odd blocks, each memory block having a plurality of pages, including even pages and odd pages; wherein the one or more die of each bank are distinct from the one or more die of every other bank of the plurality of banks;
wherein, the memory is logically divided into a set of quadrants, each quadrant including, for every bank in the plurality of banks, one or more even blocks and one or more odd blocks, and for each block in the quadrant, one or more even pages and one or more odd pages;
storing in each quadrant a set of row check words and a set of diagonal check words;
each row check word in the quadrant comprising a value encoded with a result of a mathematical operation performed on a respective row set comprising a set of data elements corresponding to the row check word;
each diagonal check word in the quadrant comprising a value encoded with a result of a mathematical operation performed on a respective diagonal set comprising a set of data elements corresponding to the diagonal check word;
reading a respective data element from a respective quadrant of the memory, and
in accordance with a determination that the respective data element is not recoverable using a first level data correction methodology, recovering the respective data element using a respective check word, comprising a row check word of the set of row check words stored in the respective quadrant of the memory or a diagonal check word of the set of diagonal check words stored in the respective quadrant of the memory, by performing a complementary mathematical operation on the respective check word with all data elements, excluding the respective data element, of a set of data elements corresponding to the respective check word;
wherein:
no more than two data elements in the row set for a respective row check word are stored in the same bank of the plurality of banks;
a first portion of the data elements in the row set are stored in a first set of blocks, the first set of blocks comprising entirely even or entirely odd blocks;
a first complementary portion of the data elements in the row set are stored in a second set of blocks, the second set of blocks comprising a set of blocks complementary to the first set of blocks and comprising entirely odd blocks or entirely even blocks, wherein:
a second portion of the data elements in the row set are stored in a first set of pages, the first set of pages comprising entirely even pages or entirely odd pages;
a second complementary portion of the data elements in the row set are stored in a second set of pages, the second set of pages comprising a set of pages complementary to the first set of pages and comprising entirely odd pages or entirely even pages;

no more than two data elements in the diagonal set for a respective diagonal check word are stored in the same bank of the plurality of banks;

a first portion of the data elements in the diagonal set are stored in the first set of blocks;

a first complementary portion of the data elements in the diagonal set are stored in the second set of blocks; and all the data elements in the diagonal set are stored in a single set of pages, the single set of pages comprising only pages in the first set of pages or only pages in the second set of pages.

21. The method of claim 20, wherein the even blocks in the quadrant comprise blocks in the quadrant satisfying predefined block designation criteria, and the odd blocks in the quadrant comprise blocks in the quadrant not satisfying the predefined block designation criteria.

22. A persistent memory device, comprising:

memory comprising a plurality of banks of nonvolatile memory cells, each bank comprising one or more die, each die comprising a memory array having a plurality of memory blocks including even blocks and odd blocks, each memory block having a plurality of pages, including even pages and odd pages, and storing a plurality of data elements;

wherein the one or more die of each bank are distinct from the one or more die of every other bank of the plurality of banks;

wherein:

the memory is logically divided into a set of quadrants, each quadrant including, for every bank in the plurality of banks, one or more even blocks and one or more odd blocks, and for each block in the quadrant, one or more even pages and one or more odd pages;

each quadrant stores a set of row check words and a set of diagonal check words;

each data element in the quadrant corresponds to a single row check word of the set of row check words and a single diagonal check word of the set of diagonal check words;

each row check word in the quadrant comprising a value encoded with a result of a mathematical operation performed on a respective row set comprising a set of data elements corresponding to the row check word, wherein:

no more than two data elements in the row set are stored in the same bank of the plurality of banks;

a first portion of the data elements in the row set are stored in a first set of blocks, the first set of blocks comprising entirely even or entirely odd blocks; and a first complementary portion of the data elements in the row set are stored in a second set of blocks, the second set of blocks comprising a set of blocks complementary to the first set of blocks and comprising entirely odd blocks or entirely even blocks;

each diagonal check word in the quadrant comprising a value encoded with a result of a mathematical operation performed on a respective diagonal set comprising a set of data elements corresponding to the diagonal check word;

no more than two data elements in the diagonal set are stored in the same bank of the plurality of banks;

a first portion of the data elements in the diagonal set are stored in the first set of blocks;

a first complementary portion of the data elements in the diagonal set are stored in the second set of blocks;

a second portion of the data elements in the diagonal set are stored in a first set of pages, the first set of pages comprising entirely even pages or entirely odd pages; and a second complementary portion of the data elements in the diagonal set are stored in a second set of pages, the second set of pages comprising a set of pages complementary to the first set of pages and comprising entirely odd pages or entirely even pages;

wherein all the data elements in the row set are stored in a single set of pages, the single set of pages comprising only pages in the first set of pages or only pages in the second set of pages.

23. The persistent memory device of claim 22, wherein the even blocks in the quadrant comprise blocks in the quadrant satisfying predefined block designation criteria, and the odd blocks in the quadrant comprise blocks in the quadrant not satisfying the predefined block designation criteria.

24. The persistent memory device of claim 23, wherein the predefined block designation criteria are met for a respective block when a predefined respective bit in a block address for the respective block is equal to a predetermined value.

\* \* \* \* \*